No. 612,899. Patented Oct. 25, 1898.
W. P. HASTY.
PLOW.
(Application filed July 21, 1897.)

(No Model.)

Witnesses
Wm. H. Edwards Jr.
Victor J. Evans

Inventor
William P. Hasty
by John Wedderburn
Attorney

UNITED STATES PATENT OFFICE.

WILLIAM P. HASTY, OF FREE HOMES, GEORGIA, ASSIGNOR OF ONE-HALF TO ELISHA J. WHITE, OF SAME PLACE.

PLOW.

SPECIFICATION forming part of Letters Patent No. 612,899, dated October 25, 1898.

Application filed July 21, 1897. Serial No. 645,378. (No model.)

*To all whom it may concern:*

Be it known that I, WILLIAM P. HASTY, of Free Homes, in the county of Cherokee and State of Georgia, have invented certain new and useful Improvements in Plows or Cultivators; and I do hereby declare the following to be a full, clear, and exact description of the invention, such as will enable others skilled in the art to which it appertains to make and use the same.

My invention relates to new and useful improvements in plows; and it consists in the novel combination and arrangement of simple parts that will be hereinafter fully described.

The primary object of the invention is to provide a plow or cultivator with improved means whereby the shovel or blade thereof may be set at any desired angle to cause the same to enter the ground to any desired depth.

A further object of the invention is to provide a cultivator or plow which will be especially simple in construction, durable, economical, and efficient in operation.

Other objects and advantages of the invention will become apparent in the course of the following description, and the points of novelty will be particularly set forth in the claim.

I accomplish the objects of my invention by the simple means illustrated in the accompanying drawings, in which—

Figure 1:
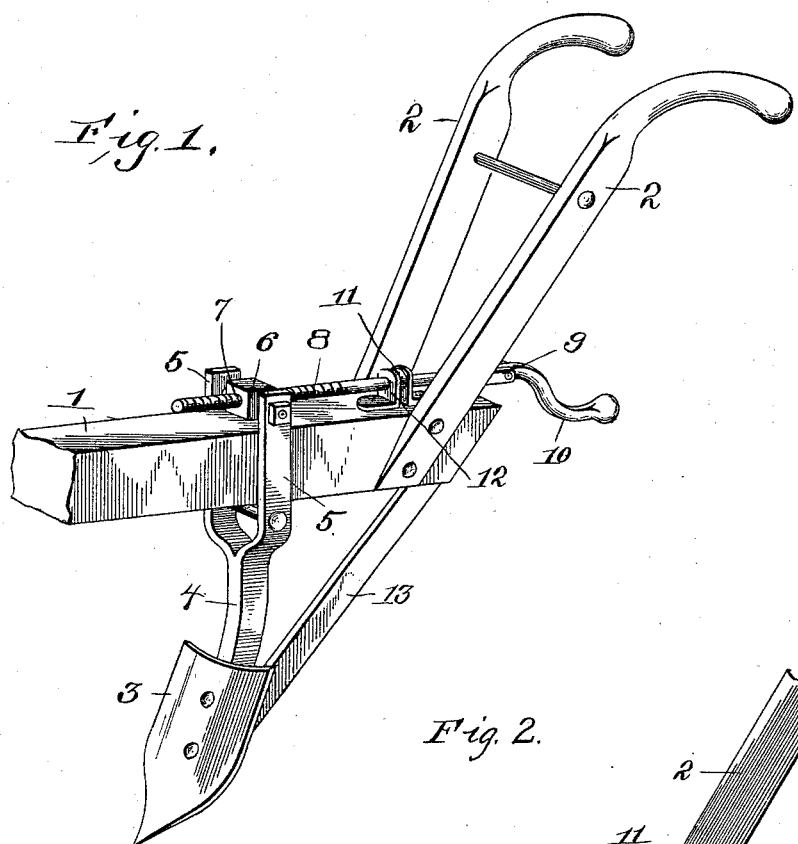
Figure 2:
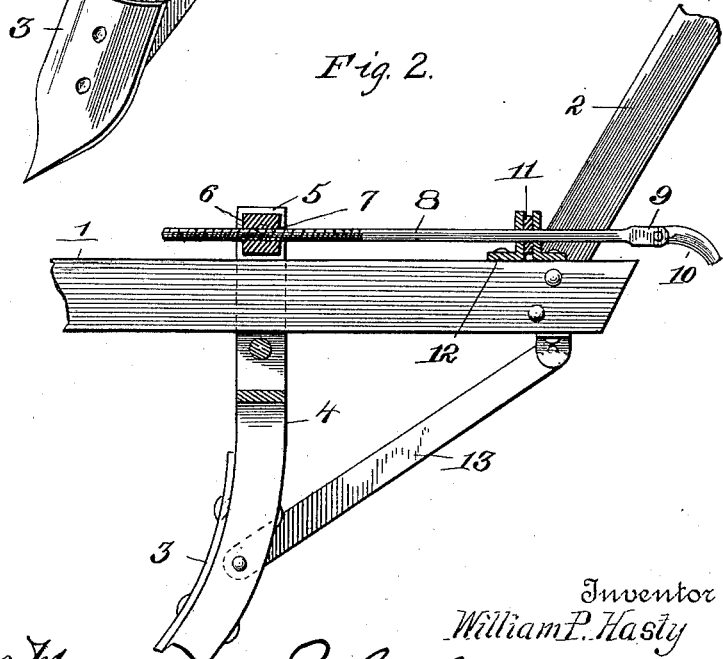

Figure 1 represents a perspective view of a plow or cultivator constructed according to my invention, and Fig. 2 represents a central longitudinal section thereof.

Referring to the drawings, the numeral 1 indicates a plow or cultivator beam, having bolted to the sides thereof, near its rear end, the usual handles 2.

The numeral 3 indicates the shovel or blade, which is bolted or otherwise secured to the plow-standard 4, bifurcated at its upper end to form two arms 5, which straddle or embrace the plow-beam, the said arms being secured to the beam by bolts passing above and below the same, substantially as shown in the drawings. Secured between the bifurcated arms, above the plow-beam, is a block or nut 6, provided with an internally-screw-threaded perforation 7 for the reception of an exteriorly-screw-threaded bar 8, which extends rearwardly to a point a little beyond the rear end of the plow-beam and is bifurcated to form two arms 9, between which is pivoted a crank 10.

The numeral 11 indicates an annular washer which is integral with the screw-threaded bar 8 and located in rear of the central portion of said bar. The said washer is adapted to rest and engage between two vertical lugs or brackets 12, which are secured to the upper side of the beam, and it will be seen that the washer located as described will prevent the bar from longitudinal movement in the direction of the length of the beam. Pivoted to the lower portion of the plow-standard 4 is an arm 13, also pivoted to the rear portion of the beam.

When it is desired to adjust the blade or shovel, the crank 10 is turned in one direction or the other, rocking the shovel backward or forward to any desired position. It will be apparent that the crank is so constructed and secured to the screw-threaded bar that it can be folded when not desired for use.

From the foregoing description it will be noted that the device herein described is especially simple in construction and that the objects of the invention will be effectually accomplished.

I do not desire to be understood as limiting myself to the precise construction shown in the drawings, as many modifications involving mechanical skill can be made without departing from the spirit of the invention.

Having thus described my invention, what I claim as new, and desire to secure by Letters Patent, is—

The combination with the plow-beam, a plow provided with a standard formed with arms to embrace the plow-beam, and a pivotally-connected brace-rod 13 having one end connected to the plow and the other to the beam, of a means for adjusting the pitch of the plow, comprising a screw-threaded nut 6 secured between the upper ends of the arms of the plow-standard, a threaded adjusting-rod let through the said nut 6 and formed with an annular washer 11, vertical lugs on the plow-beam in which the adjusting-rod has bearing and between which the annular washer thereon is disposed, and means to turn the adjusting-rod.

In testimony whereof I have signed this specification in the presence of two subscribing witnesses.

WILLIAM P. HASTY.

Witnesses:
JAMES D. CRESS,
LEE MULLINS.